US011085490B2

(12) United States Patent
Swoboda et al.

(10) Patent No.: US 11,085,490 B2
(45) Date of Patent: Aug. 10, 2021

(54) SLIDING ELEMENT, IN PARTICULAR FOR A STRETCHING INSTALLATION AND/OR CONVEYOR CHAIN, AND ASSOCIATED STRETCHING INSTALLATION OR CONVEYOR CHAIN

(71) Applicant: BRÜCKNER MASCHINENBAU GMBH & CO. KG, Siegsdorf (DE)

(72) Inventors: Martin Swoboda, Freilassing (DE); Tobias Häusl, Traunstein (DE); Emmerich Kulinyak, Ruhpolding (DE); Sebastian Kraus, Siegsdorf (DE); Georg Murner, Bergen (DE); Markus Unterreiner, Marquartstein (DE); Werner Bamberger, Wolkersdorf (DE); Anthimos Giapoulis, Traunstein (DE); Michael Baumeister, Traunstein (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 0 days.

(21) Appl. No.: 16/628,836

(22) PCT Filed: May 15, 2018

(86) PCT No.: PCT/EP2018/062487
§ 371 (c)(1),
(2) Date: Jan. 6, 2020

(87) PCT Pub. No.: WO2019/007577
PCT Pub. Date: Oct. 1, 2019

(65) Prior Publication Data
US 2020/0132118 A1   Apr. 30, 2020

(30) Foreign Application Priority Data
Jul. 6, 2017   (DE) .................. 10 2017 115 175

(51) Int. Cl.
F16C 33/16      (2006.01)
B29C 55/08      (2006.01)
B29D 7/01       (2006.01)

(52) U.S. Cl.
CPC ............. *F16C 33/16* (2013.01); *B29C 55/08* (2013.01); *B29D 7/01* (2013.01)

(58) Field of Classification Search
CPC ......... F16C 33/16; B29C 55/08; B29C 55/20; B29C 55/165; B29D 7/01
See application file for complete search history.

(56) References Cited

U.S. PATENT DOCUMENTS 5,656,213 A * 8/1997 Sakaguchi ............ C04B 35/117
264/12
5,797,172 A   8/1998 Hosmer
(Continued)

FOREIGN PATENT DOCUMENTS

CN   1714141     12/2005
CN   102741030   10/2012
(Continued)

OTHER PUBLICATIONS

International Preliminary Report on Patentability (Chapter I) for EP Appln. No. PCT/EP2018/062487, dated Jan. 16, 2020.
(Continued)

*Primary Examiner* — James C Goloboy
(74) *Attorney, Agent, or Firm* — Nixon & Vanderhye P.C.

(57) ABSTRACT

The invention relates to a sliding element, in particular for a stretching installation and/or a conveyor chain, comprising graphite or electrographite, wherein the sliding element has pores which have an open pore size of ≥7.5% by volume, and wherein the particle size of the graphite particles used as a starting material for the sliding elements is between 3 μm and 15 μm.

28 Claims, 10 Drawing Sheets

(56) References Cited

U.S. PATENT DOCUMENTS

| | | | |
|---|---|---|---|
| 6,294,029 B1* | 9/2001 | Sakate | B23P 9/00 148/211 |
| 2001/0025014 A1* | 9/2001 | Vesper | F16C 33/201 508/108 |
| 2006/0063684 A1 | 3/2006 | Yamamoto | |
| 2008/0146467 A1* | 6/2008 | Takayama | C22C 33/0278 508/105 |
| 2009/0277731 A1 | 11/2009 | Hwang | |
| 2014/0315408 A1 | 10/2014 | Colapietro et al. | |
| 2015/0314521 A1 | 11/2015 | Baumeister et al. | |
| 2016/0104969 A1 | 4/2016 | An et al. | |
| 2017/0233671 A1* | 8/2017 | Yamauchi | C10M 125/08 508/106 |

FOREIGN PATENT DOCUMENTS

| | | |
|---|---|---|
| CN | 103299094 | 9/2013 |
| CN | 104162979 | 11/2014 |
| CN | 104999736 | 10/2015 |
| DE | 86 04 445 | 7/1987 |
| DE | 39 25 737 | 2/1991 |
| DE | 40 25 914 | 2/1992 |
| DE | 34 85 772 | 12/1992 |
| DE | 42 21 318 | 1/1993 |
| DE | 196 10 813 | 10/1996 |
| DE | 197 49 785 | 5/1999 |
| DE | 198 57 289 | 5/2000 |
| DE | 10 2011 113 062 | 3/2013 |
| EP | 0 138 117 | 4/1985 |
| EP | 0 471 329 | 2/1992 |
| EP | 0471239 A2 * | 2/1992 ......... G01N 29/2418 |
| EP | 0 500 447 | 8/1992 |
| EP | 1 652 877 | 5/2006 |
| EP | 3 048 162 | 7/2016 |
| TW | M457606 | 7/2013 |
| WO | WO 2013/113154 | 8/2013 |
| WO | 2014/094803 | 6/2014 |

OTHER PUBLICATIONS

International Search Report for PCT/EP2018/062487, dated Jul. 25, 2018, 5 pages.

Written Opinion of the ISA for PCT/EP2018/062487, dated Jul. 25, 2018, 6 pages.

Translation of Notification of First Office Action issued in CN App. No. 201880045142.6 (dated Mar. 10, 2021).

* cited by examiner

SLIDING ELEMENT, IN PARTICULAR FOR A STRETCHING INSTALLATION AND/OR CONVEYOR CHAIN, AND ASSOCIATED STRETCHING INSTALLATION OR CONVEYOR CHAIN

This application is the U.S. national phase of International Application No. PCT/EP2018/062487 filed 15 May 2018, which designated the U.S. and claims priority to DE Patent Application No. 10 2017 115 175.3 filed 6 Jul. 2017, the entire contents of each of which are hereby incorporated by reference.

The invention relates to a sliding element, in particular for a stretching installation and/or conveyor chain, and to an associated stretching installation or conveyor chain in accordance with the preamble of claim 1.

TECHNICAL FIELD

Stretching installations are used in particular in plastics material film production.

Sequential stretching installations are known in which a plastics material film is stretched in two successive stages, for example initially in a longitudinal direction and subsequently in a transverse direction (or vice versa).

Simultaneous stretching installations are also known in which a plastics material film can be stretched in a transverse and a longitudinal direction simultaneously.

PRIOR ART

A generic transverse stretching installation or transverse stretching stage within a stretching installation is known from U.S. Pat. No. 5,797,172 A, WO 2014/94 803 A1 or DE 198 57 289 C1. In these prior publications, a material web to be stretched, thus generally a plastics material film, is gripped using pegs which are fixed to chains and which are arranged displaceably on peripheral guide rails on both sides of the material web to be stretched. In this context, the pegs are displaced in succession from an entry zone (in which the edge for example of a plastics material film to be stretched is gripped) via a stretching zone (in which the opposite pegs are moved away from one another on the guide rail portions with a transverse component diverging from the conveying direction) to an exit zone, and subsequently back to the entry zone on a return path, it being possible for the film to be subjected for example to some amount of relaxation and/or heat post-treatment in the exit zone. This transverse stretching installation comprises a guide rail along which the conveyor chain is guided.

The conveyor chain in general and the peg bodies in particular, which are formed positioned offset on the chain links in the longitudinal direction of the conveyor chain, have sliding elements or roller elements which are moved together with the peg and which are positioned on the two opposite running and sliding faces, which face away from one another and extend vertically and mutually parallel. In this context, the carrier bodies which are attached to chain links may have sliding elements present in a plurality of sliding planes. In simultaneous stretching installations, both the guide rail elements and the control rail elements may be equipped with sliding elements.

DE 198 57 289 C1 discloses an improved method for lubricating conveyor systems and parts thereof, in particular for lubricating corresponding parts of a stretching installation, and an improved lubricant device. A corresponding conveyor system having improved lubrication is brought about as a result of continuous micro-amount lubrication, making it possible to reduce lubricant consumption.

Elastomers, thermoplastics or thermosets containing graphite sliding elements and/or graphite particles are known in principle from WO 2014/94 803 A1 and DE 39 25 737 A1.

EP 0 138 117 A2 further discloses a fabric web conveyor chain, in which a carrier body for pegs is fixed as considered in the chain longitudinal direction and these chain links have approximately a sideways U shape in the chain cross section. On each of these specially shaped chain links, large-area, specially shaped plates of lubricant-free sliding material, preferably low-friction polytetrafluoroethylene, are fixed to the lower U limb by rivets. These sliding material plates are also specially shaped in such a way that they fit together with correspondingly made recesses in the associated chain links. This structural configuration alone requires the production of a base chain formed specially for this purpose, with complex chain links for the individual carrier bodies.

WO 2014/94 803 A1 discloses sliding elements which can absorb both the film forces and chain forces and the gravitational forces of the chain.

EP 0 471 329 B1 and EP 1 652 877 B1 describe the use of synthetic-resin-bonded impregnated graphite as a sliding body.

OBJECT OF THE INVENTION

Against this background, the object of the present invention is to provide a sliding element, in particular for a stretching installation and/or conveyor chain, on the one hand, and an associated stretching installation or conveyor chain, on the other hand, the sliding elements and the stretching installation or conveyor chain fitted with the sliding elements being formed in such a way that the lubricant requirement can be reduced considerably by comparison with conventional sliding elements or stretching installations or conveyor chains.

The object is achieved according to the invention in accordance with the features specified in claim 1, for a sliding element, and in accordance with the features specified in claim 11, for a stretching installation or conveyor chain. Advantageous embodiments of the invention are specified in the dependent claims.

It has to be noted as highly surprising that, for the operation of conveyor chains (which are moved on guide rails (and control rails in simultaneous systems) by means of which the conveyor chains are supported and carried) and in particular for the operation of stretching installations, the use of the sliding elements according to the invention makes it possible for the necessary lubricant requirement by comparison with the prior art to be reducible drastically.

The use of graphite sliding elements was well known in the prior art. As stated previously, sliding bodies which consist of or comprise graphite can be derived as being known from EP 0 471 329 B1 and DE 197 49 785 A1. These previously known sliding bodies are impregnated with inorganic salts and then with polymers.

In the context of the invention, however, it has been found that the graphite sliding elements known in the prior art, and in particular also the aforementioned graphite sliding elements, are less suitable for the use of conveyor chains and in particular in stretching installations.

Particularly good results can be achieved in the context of the invention if one or more of the following preferred variants and/or conditions are implemented or met:

The sliding elements are provided with an impregnation, preferably in the form of inorganic salts, in particular phosphates (salts and esters of orthophosphoric acid)

The sliding elements are impregnated with metal salts, in particular in the form of aluminium phosphate ($AlPO_4$).

The inorganic salts, in particular in the form of phosphates and particularly preferably in the form of aluminium phosphate, are embedded in the sliding element or sliding body in a proportion of 1% by weight to 20% by weight.

The phosphates and in particular metal phosphates should preferably have particle sizes in the region of d50=30 μm, d90=100 μm and d50=5 μm, d90=15 μm, and particularly preferably of d50=7 μm, d50=30 μm.

The sliding elements are fully impregnated not only in a surface region or a surface layer up to 1 mm or 2 mm, but preferably completely.

The starting materials required for manufacturing the sliding elements are "baked" together using a suitable method, for example by isostatic pressing, ultimately causing the sliding elements to be produced.

The particle sizes and the particle distribution of the graphite powder used as a starting material for manufacturing the sliding elements should also be in particular ranges. The maximum particle size distribution (average particle size, expected value) of the graphite powder used as a starting material, but also of the sliding element manufactured by pressing, is between 3 and 15 μm, depending on the desired mechanical values, for example the bending strength. Preferably, average particle sizes between 7 and 10 μm have been found to be suitable. Sizes between 14 and 18 μm as a median d(50), between 2 and 4 μm as a d(10) and between 42 and 50 μm as a d(90) have been measured. (The values $d_{10}$, $d_{50}$ and $d_{90}$ are used to characterise a particle size distribution. The $d_{50}$ value is defined as the average particle size distribution [DIN 13320]. The values $d_{10}$ and $d_{90}$ are used to describe the width of a particle size distribution $d_{width}=d_\pi-d_{10}$).

The open pore sizes and/or pore distribution of the sliding elements is at least ≥8 by volume or preferably ≥9% by volume, 10% by volume, 11% by volume, 12% by volume, 13% by volume, 14% by volume or ≥15% by volume. In this context, the corresponding values for the open pore size of the sliding element should also be ≤20% by volume, in particular ≤18% by volume, 16% by volume, 15% by volume, 14% by volume, 13% by volume, 12% by volume or in particular ≤11% by volume.

The sliding elements have for example oil-saturated pores or in general fluid-filled pores, specifically under conventional operating conditions, for example at an air humidity of ≥5 (preferably 8-20) [$g/m^3$].

In tests, it has been found to be particularly advantageous if the pores of the sliding elements are soaked with oil as completely as possible, for example by storing them in an oil bath for several hours before they are installed in the bearing elements. This primary saturation greatly reduces wear.

The particle sizes and particle distributions of the graphite are essential for example for the mechanical property of the sliding element. This relates not only to the wear properties, but also to the bending strength of the material, for example. Likewise, the particle size and distribution of the graphite powder (as a starting material or in the pressed form after the final sliding element has been manufactured) influence the thermal and chemical behaviour.

The inorganic salts and the size and size distribution thereof influence the friction behaviour and thus the wear behaviour.

In this context, the most important condition for achieving the advantages according to the invention is that the sliding elements have a minimum pore size as specified. An additional improvement can therefore be achieved if the sliding elements, as mentioned, have been appropriately impregnated using inorganic salts (in particular phosphates) and/or been subjected to isostatic pressing.

In this context, the greatest advantages are achieved in the context of the invention if all three aforementioned conditions are implemented.

Casing the sliding elements or the graphite sliding elements with polymers and/or filling the pores (in particular the pores on the surface of the sliding means) with polymers (as described in EP 0 471 329 B1) actually leads to disadvantages by comparison with the invention as regards the sliding effect, since in this case the friction is increased again and thus a larger amount of lubricant has to be used. In particular in stretching installations, there is thus the risk that the plastics material film to be stretched is subject to a greater risk of contamination with lubricant and in particular with lubricant droplets.

Thus, if by contrast sliding elements or sliding element pairs of this type according to the invention are used in connection with conveyor chains and especially in stretching installations, the described drastic reduction in oil medium can be achieved. The sliding bodies according to the invention are thus highly superior to the conventional graphite sliding elements in this regard, since the sliding elements or graphite sliding elements known in the prior art have a high degree of wear, in particular in the highly loaded curved portions and in particular in the stretching zone in stretching installations.

Some significant advantages are thus achieved in the context of the invention.

Thus, the wear can be reduced greatly in the entry phase of approximately 1-2 hours.

As a result of the dramatic reduction in the lubricant amounts, the soiling of the film to be manufactured by condensate precipitates and micro-droplets is reduced or prevented.

As a result of the sliding elements according to the invention, it is further possible to raise the temperatures of the materials involved in the sliding pair.

As a result of the new materials, it is possible to use uniform base components, which merely have to be adapted to the pegs and guide rails (and control rails) using adapter solutions, over different series of chain conveyor systems.

As a result of the new materials, different fluids, other than high-performance oils, can also be used as an intermediate layer between the sliding pairs.

The graphite sliding elements according to the invention can be used in particular in sliding path lubrication as well as in chain pin lubrication.

These graphites may also be embedded in polymer matrices, and exhibit similar properties to the "pure" graphite elements Tecasint, Sinimit (registered trade marks of Ensinger, DuPont SCP), etc.

In the context of the invention, other surprising results have also been found. Thus, the aforementioned advantages are achieved not only when the sliding bodies according to the invention are used, but also especially when the sliding bodies according to the invention are used within a specific sliding pair, for example with guide or control rails which have a particular material constitution or surface constitution.

In this regard, the invention also relates to a method for further reducing the lubricant and in particular oil amounts in the lubrication of conveyor systems or parts thereof, thus not only by using specific sliding bodies or sliding elements, but also especially by using the sliding bodies or sliding elements according to the invention in conjunction with corresponding guide rails (and control rails). Thus, according to the invention, specific sliding pairs are proposed, which make it possible to reduce the lubricant requirement.

Sliding Pairs

When sliding pairs are referred to, this is understood to mean a guide rail or control rail (for a conveyor chain), in other words in particular including a guide and/or control rail in stretching installations, as well as corresponding sliding elements which are provided or formed on the chain or peg chain or the pentagraph system. In the prior art, these sliding elements—as mentioned previously—often consist of plastics materials reinforced with carbon fibres, aramid fibres or glass fibres, for example including with additions of PTFE, in other words polytetrafluoroethylene, or materials such as PEEK, in other words polyether ether ketone.

As mentioned previously, in the prior art sliding pairs comprising graphite elements were proposed (for example the aforementioned EP 0 471 329 A1 or EP 1 652 877 A1), without their use in stretching machines and the special requirements thereof explicitly being discussed.

Meanwhile, in the context of the invention, it has been found that sliding pairs are particularly suitable which consist of the sliding elements according to the invention (as dealt with above) and additionally of rail systems, in particular in the case of a stretching installation, of a guide or control rail consisting of a material having an identical or similar thermal expansion coefficient to the sliding elements. It has further been found in the context of the invention that good counter partners for the sliding elements according to the invention (which comprise a high proportion of graphite) are hard materials such as grey iron, hard metal, aluminium oxide, silicon carbide, glass, materials coated with DLC ("diamond-like carbon", an amorphous carbon similar to diamond), and in particular hard-alloy steels such as are used for guide rails and control rails of stretching installations.

Hereinafter, the invention will be described in greater detail with reference to embodiments. In the drawings, in detail:

BASIC CONSTRUCTION OF A TRANSVERSE STRETCHING INSTALLATION

Figure 1:
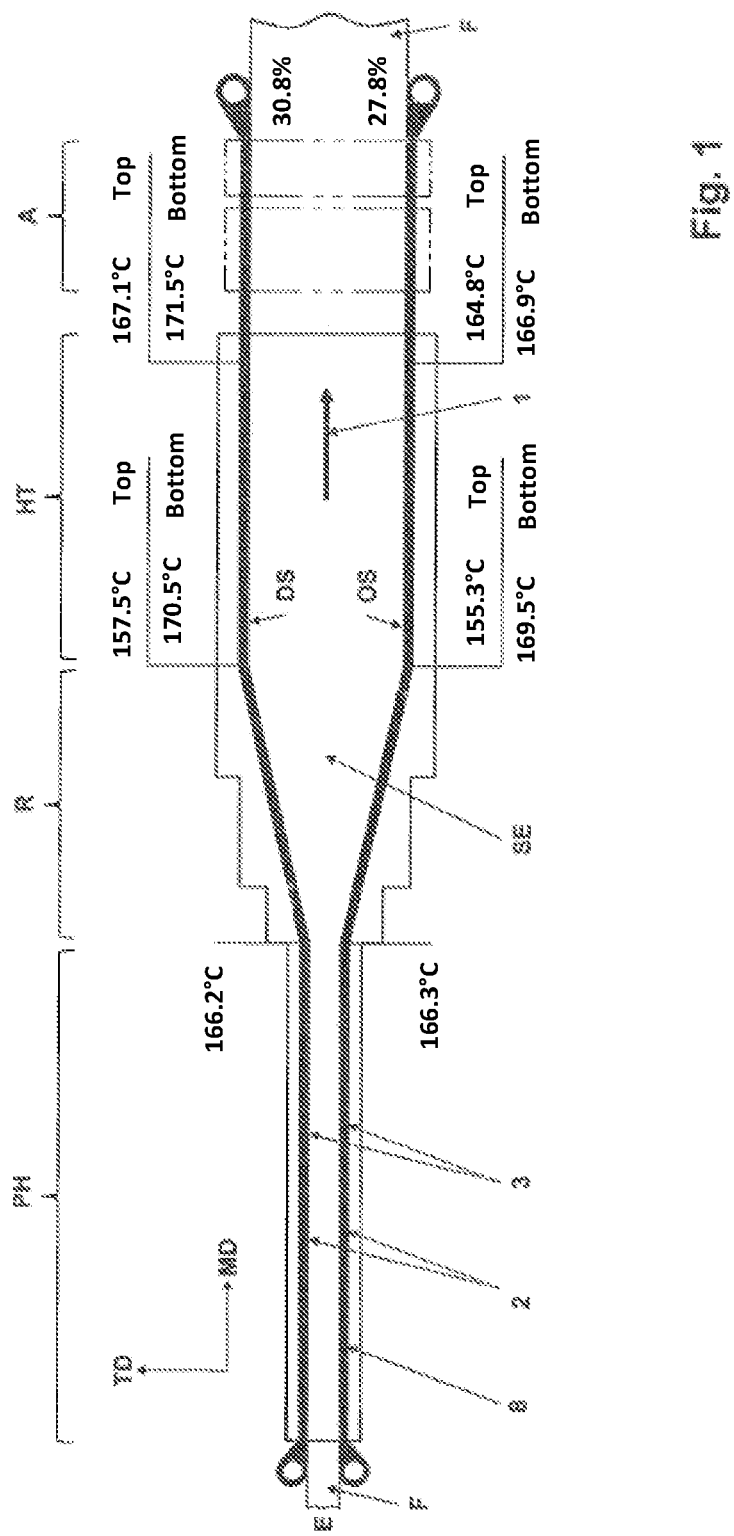
FIG. 1 is a schematic plan view of a transverse stretching installation, which may also be part of a sequential stretching installation.

In a known manner, the film lateral or transverse stretching installation described below, also denoted hereinafter as a TD stretching installation for short (TD=transverse direction), has two symmetrically formed drive systems. FIG. 1 shows the two drive systems, which extend perpendicular to the plane of the drawing and are arranged symmetrically about the plane of symmetry SE, the material web to be treated, in other words stretched, in particular in the form of a plastics material film F, being moved along the drawing direction 1 (in other words in the machine direction MD) between the two drive systems, which circulate on closed paths 2. In this context, the described TD stretching installation may also be part of a sequential stretching installation, which conventionally comprises a longitudinal stretching stage upstream from the transverse stretching installation (transverse stretching frame) (although, for the avoidance of doubt, this longitudinal stretching stage may also be downstream from the transverse stretching stage). However, the invention may also in principle be used in pentagraph systems, in other words in simultaneous stretching installations in which, by way of scissor systems, using control rails in a divergent stretching zone, the conveyor chains, which move along guide rails and are fitted with pegs, are not only moved apart in the transverse direction of the stretching installation, but also increasingly spaced apart in the longitudinal direction of the stretching installation, so as to perform the simultaneous longitudinal and transverse stretching.

The stretching installation shown in FIG. 1 thus comprises two chain conveyor systems 3 driven on the two peripheral paths 2 in the circulation direction.

A monoaxial or uniaxial film F (if a longitudinal stretching installation is upstream from the transverse stretching installation shown) or an unstretched film F (film being referred to in the following, even though a treatment web F in general can be treated and transversely stretched accordingly using a stretching installation of this type, meaning that the invention is not limited to a plastics material film web in this regard) passes into the stretching installation in the entry region E, where it is gripped and clamped by pegs, which are explained further hereinafter, such as are shown for example in FIG. 2, at both edges 8, specifically both on the operator side (OS) and on the drive side (DS). The film F is then heated in a downstream preheating zone PH, and subsequently supplied to a stretching zone R so as to be stretched in the transverse direction TD there. Subsequently, the stretched film F passes through various heat treatment zones HT, in which the film may also be relaxed. At the end of the stretching installation, in the exit zone A, the film is unpegged using suitable means and then leaves the transverse stretching machine, in other words the transverse stretching installation TD.

Figure 2:
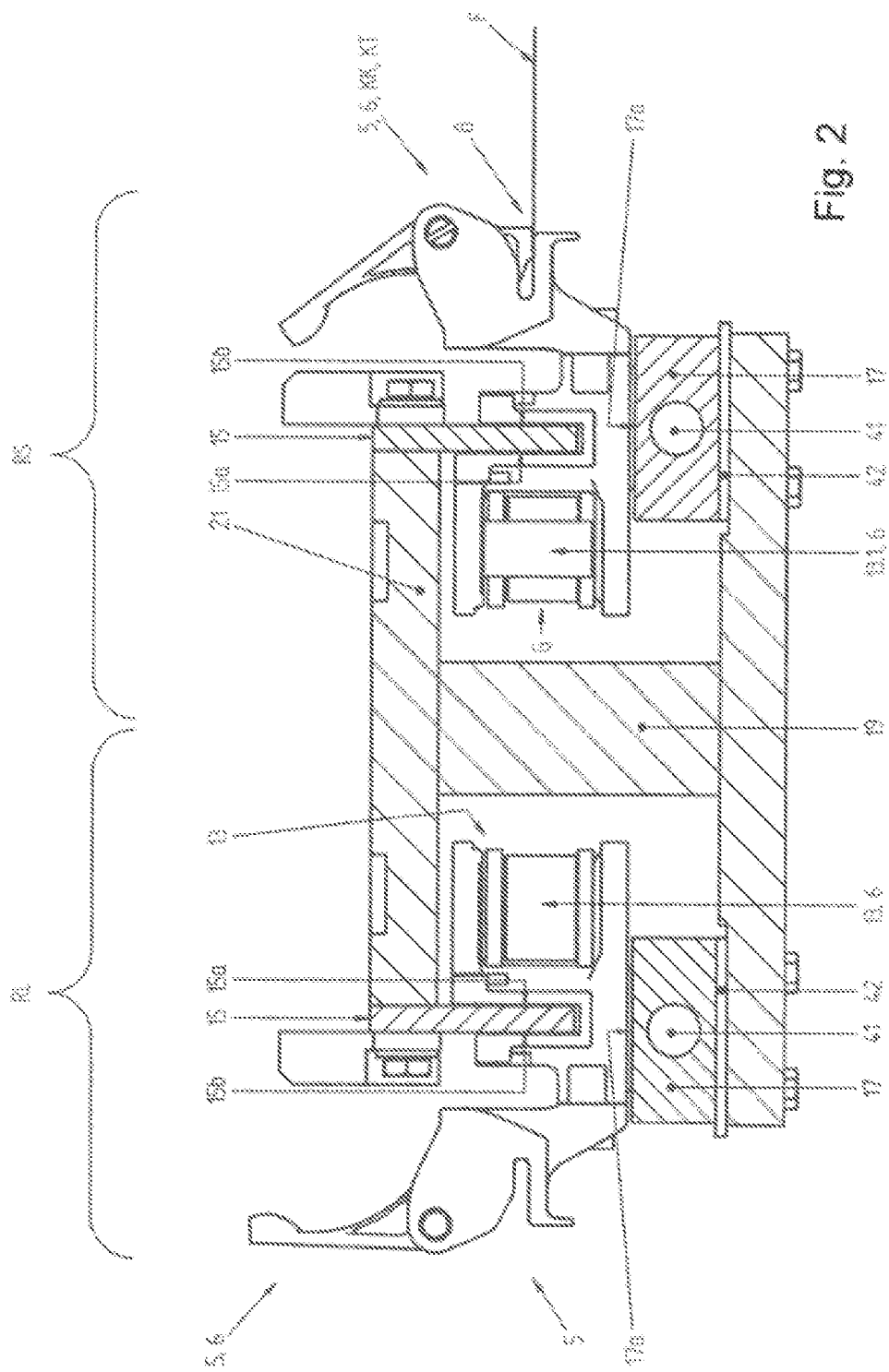
FIG. 2 is a cross section through a carrier device comprising a conveyor chain having associated pegs, which are guided in the advance direction of the film web on one side of the carrier device and carried back onto the return path on the opposite side.

In the following, a peg conveyor unit KT is also discussed, sometimes also denoted hereinafter as a peg chain unit KK (FIG. 2). This peg conveyor unit KT or peg chain unit KK may have various technical configurations/variants. Only one variant is to be explained here by way of example, further variants being known to a person skilled in the art from the prior art. The aforementioned peg conveyor unit KT or peg chain unit KK comprises the peg part 6, which is connected to the chain part or conveyor part 7. In the described example, in which a conveyor chain is used, a chain part 7 which is part of the peg chain unit KK is preferably referred to.

As is known and as is shown in cross section in FIG. 2, these peg chain units KK, in other words the aforementioned peg part 6 and the chain part 7, are located in a peripheral conveyor system 3 which comprises a carrier structure, in other words a carrier construction 11 and a peripheral conveyor chain 13 on which the aforementioned peg parts 6 are fixed or formed so as to be entrained. The carrier construction 11 comprises a guide rail 15. In addition to this guide rail 15, a carrier rail 17, sometimes also designated hereinafter as a weight running rail 17, which receives the weight of the chain and the pegs is also further provided. As can further be seen from the following description, the conveyor chain, along with the pegs displaceable together therewith, is guided and supported on the guide rail 15 using sliding bodies GK configured according to the invention, which are provided or mounted on the underneath of the conveyor chain and in particular on the pegs or peg bodies so as to be entrained therewith.

The described carrier structure may be used as a shared carrier structure for the conveyor system both on the stretching or process side RS and on the return side RL (FIGS. 1 and 2). Other variants in which the carrier structure is provided by the guide or control rail are also known to a person skilled in the art from the prior art.

FIG. 2 is a cross section through the conveyor system, specifically with a shared carrier structure 11, which as well as a centrally arranged, relatively vertically extending carrier 19 comprises a transverse carrier 21 supported thereby, the rail 15, which extends from top to bottom and is generally rectangular in cross section, being mounted on each of the opposing ends, which face away from one another, of said carrier, specifically as stated on the stretching side RS on the one hand and on the rear side RL on the other hand. For example, in a shared carrier arrangement of this type, the conveyor system as a whole is located inside a furnace O. This furnace encloses the preheating zone PH, the stretching zone R and the post-heating zone or relaxation zone HT, in such a way that ultimately only the deflection and drive systems provided on the inlet and outlet side end up located outside the furnace O.

As stated, the conveyor chain 13 is driven and deflected on both the exit and the entry side by exit and/or entry wheels AR and ER.

Figure 3A:
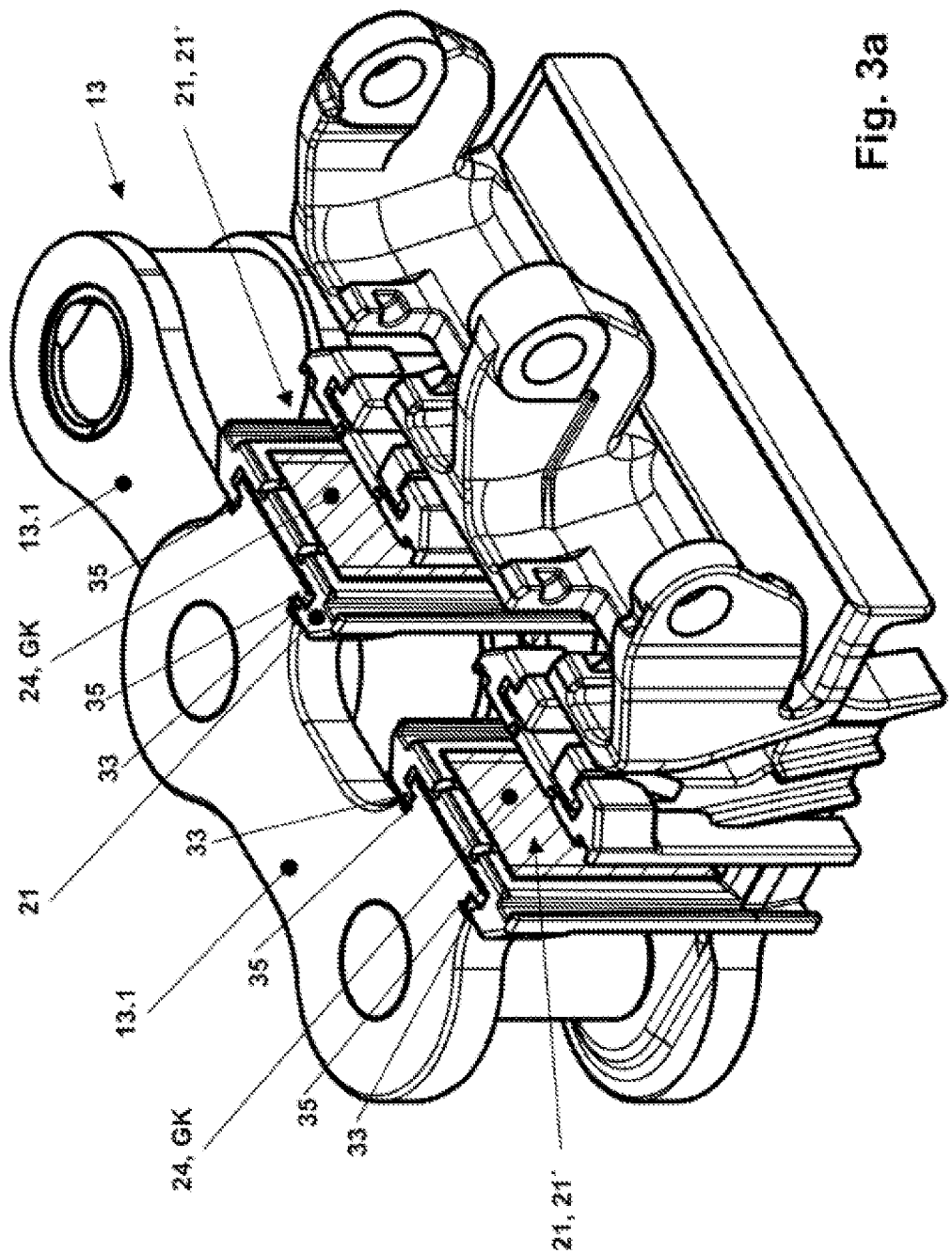
FIG. 3a is a three-dimensional drawing of a detail of a conveyor chain having an associated peg unit, such as is used in a plastics material film stretching installation.

In this context, FIG. 3a shows a detail of an example of a conveyor chain 13, the conveyor chain, in a known manner, comprising chain links 13.1 in each case which are articulated to one another.

Figure 3B:
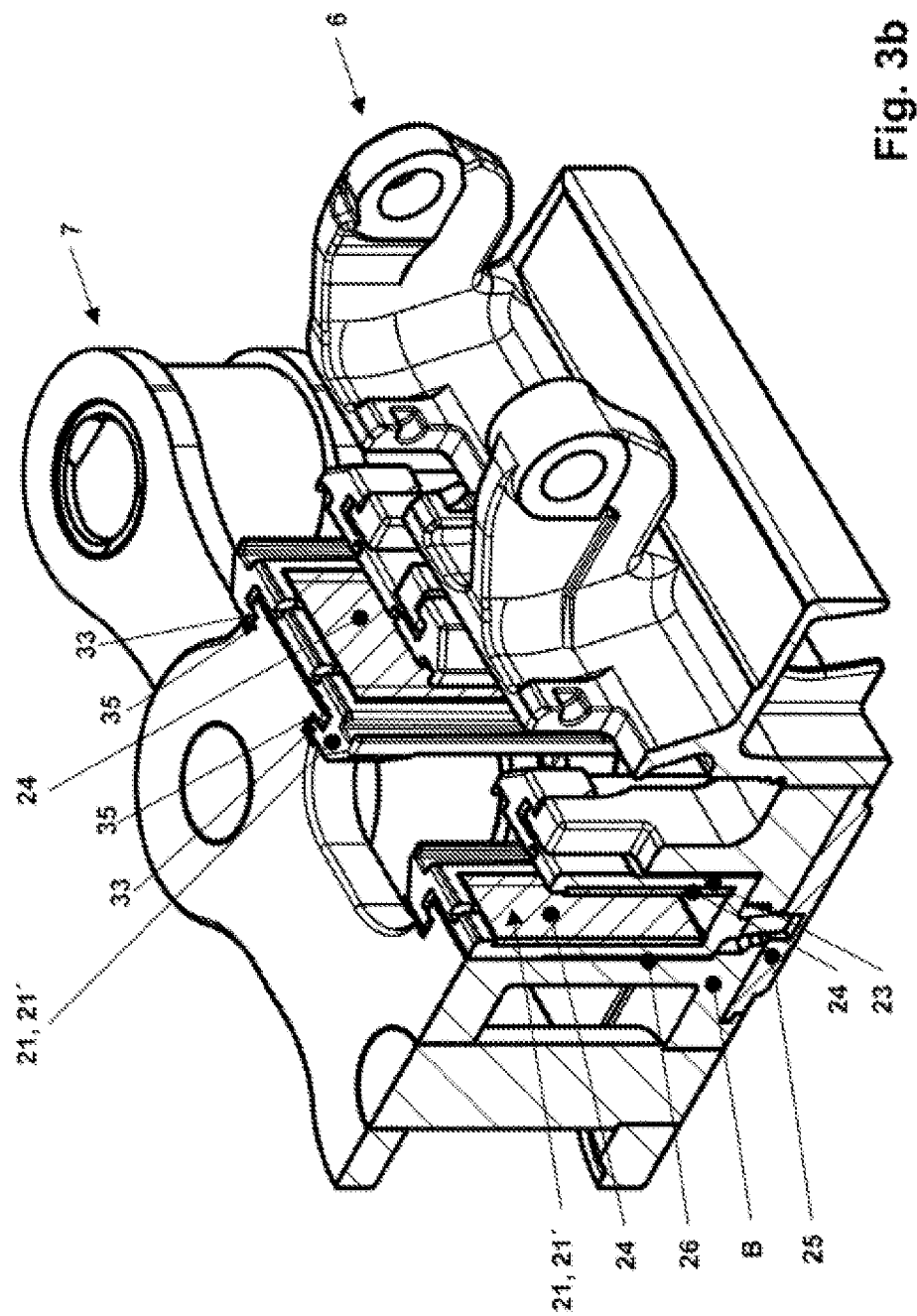
FIG. 3b is a drawing corresponding to FIG. 3a, but partially in a cross section through the chain pins of the conveyor chain.
Figure 4:
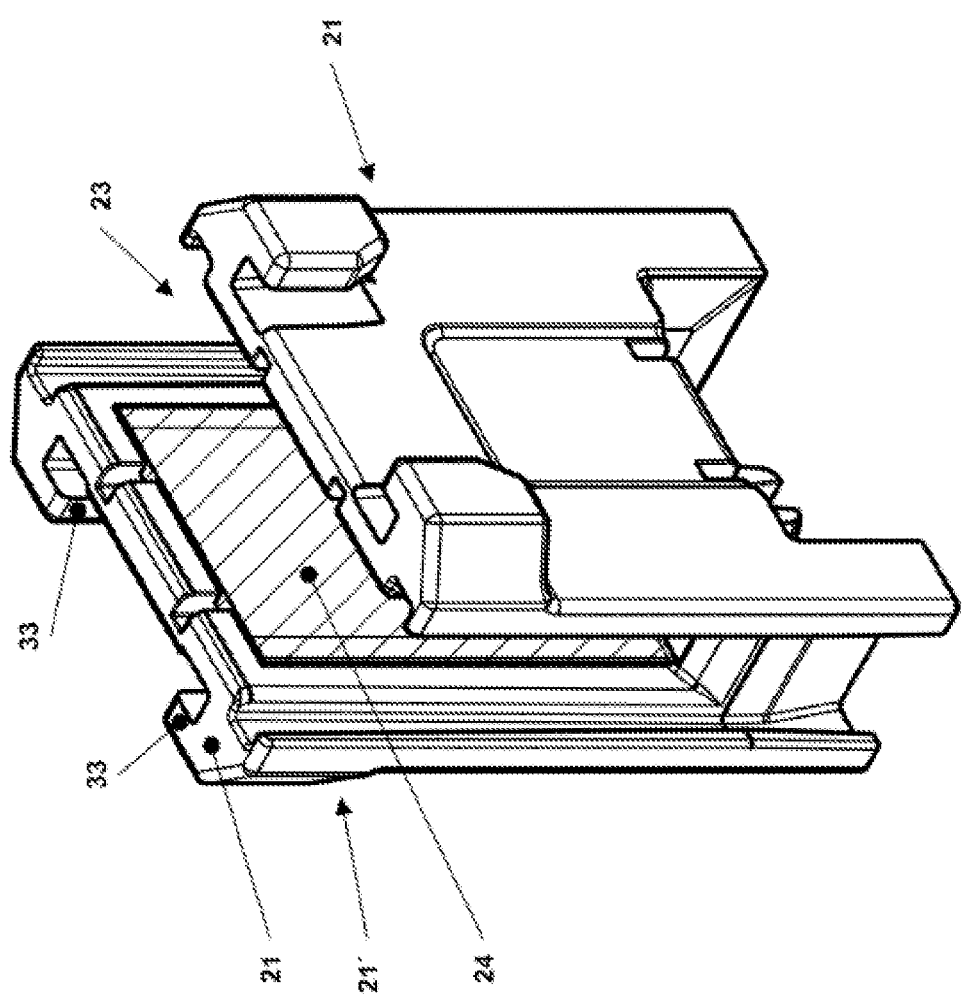
FIG. 4 is a three-dimensional drawing of a sliding element or sliding body which has a U-shaped cross section and which is fitted, on the mutually facing inner faces, with a sliding element according to the invention.

In this context, FIG. 3b is an example drawing, corresponding to FIG. 3a, of a conveyor chain without pegs, specifically partially in a cross section extending through a chain pin that passes through the chain links. This cross-sectional drawing shows not only the sliding elements 24 for the guide rail, which are inserted into the U-shaped recess 23 in the sliding block 21, but also the base sliding plate 25, via which the conveyor chain is positioned on a corresponding top of a sliding face of a guide rail. In this regard, a corresponding sliding block 21 is shown in FIG. 4 and a sliding base element 25 is shown in FIG. 5 in a three-dimensional drawing.

Figure 5:
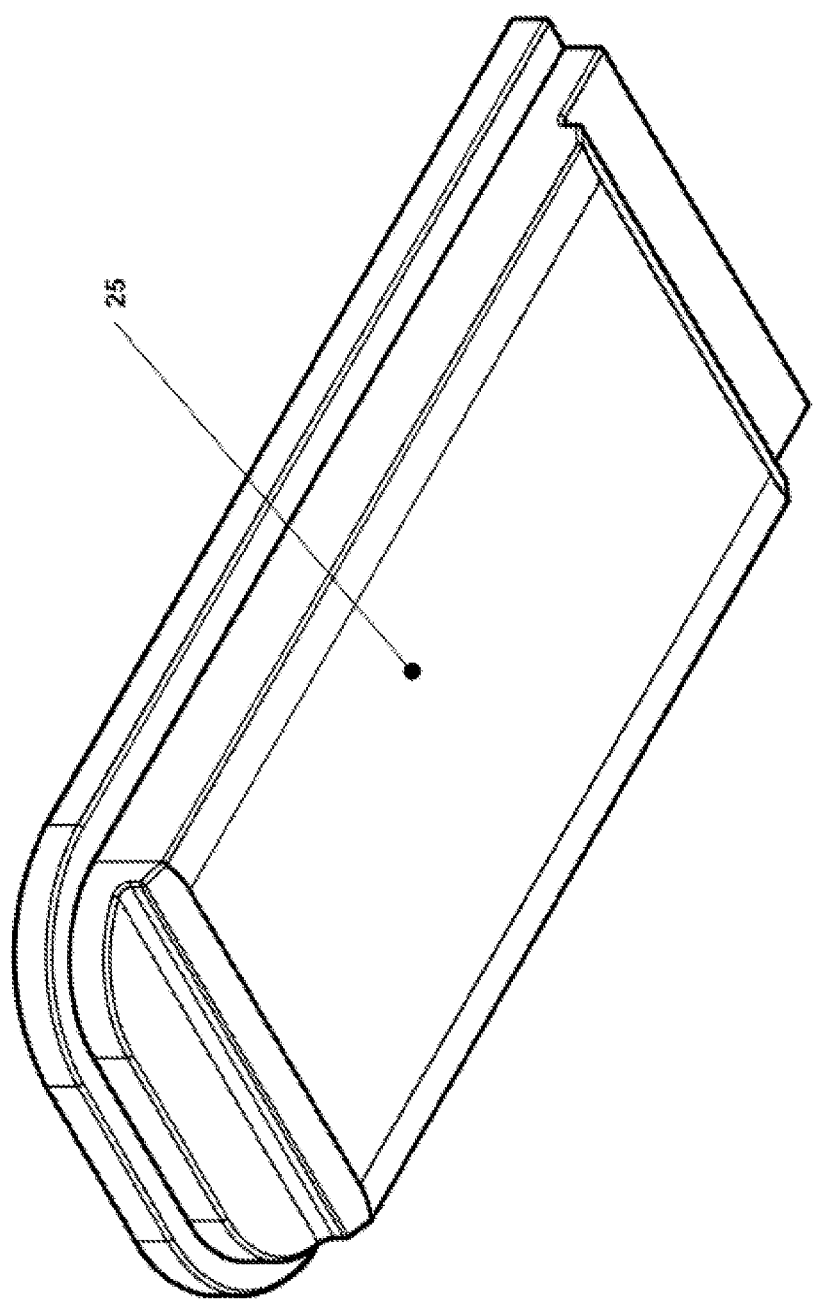
FIG. 5 is a three-dimensional drawing of a sliding base element, such as may be used and/or provided on the bottom of the conveyor chain and/or of a peg body so as to interact with a corresponding carrier face of a carrier rail.

In this context, the sliding block 21 may itself consist of or predominantly comprise a fibre-reinforced thermoplastics plastics material, preferably in the form of PEEK (polyether ether ketone), in which, in interaction with the two opposite, lateral and generally vertical guide faces of the guide rail 15, corresponding sliding elements or sliding plates 24 are used, which are configured according to the invention, as well as the sliding base element or plate 25 shown in FIG. 5 for interaction with the generally upward-facing guide face of a guide rail 15.

The overall arrangement is for example such that a U-shaped recess 26 is provided between the peg part 6 (in other words the actual peg portion) and the chain part 7 (in other words the actual chain portion) so as to form a lower bridge part B (via which the peg part is connected to the chain part), a corresponding guide rail sliding bearing 21' being inserted, sometimes also denoted hereinafter as a sliding block 21.

This guide rail sliding bearing 21' thus comprises a sliding body or sliding block 21 of U-shaped cross section having an appropriate width or length in the direction of the guide rail 15 for absorbing the corresponding guide forces here. It should be emphasised that the sliding elements may be of any desired shape and are not limited to the aforementioned U shape.

Figure 6:
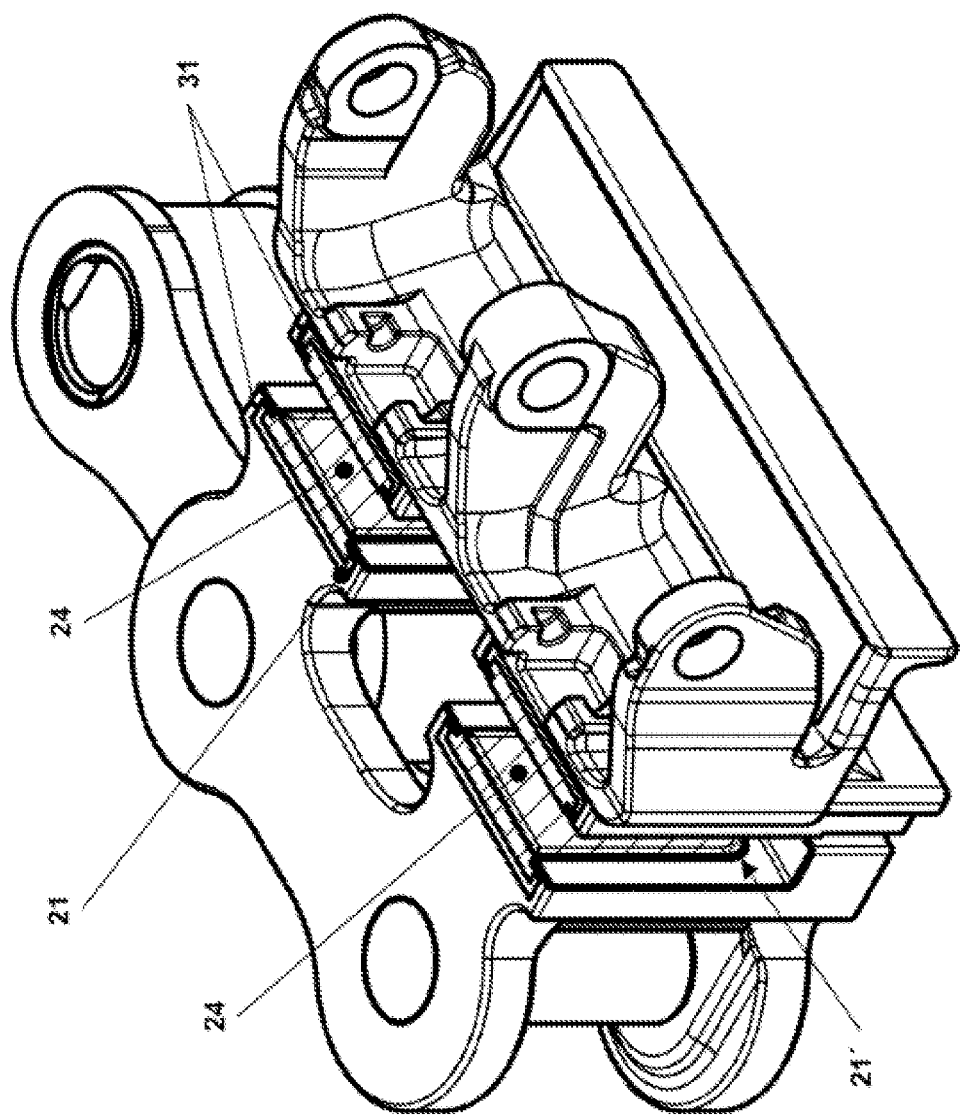
FIG. 6 shows an embodiment modified from FIG. 3a in which the sliding bodies are inserted directly into the conveyor chain bodies and/or peg bodies, preferably being anchored detachably and thus replaceably.

In a deviation from FIGS. 3a and 3b, FIG. 6 merely shows that the sliding elements 24 may also be inserted directly into corresponding recesses in the conveyor chain and in particular in the peg body, preferably detachably and thus replaceably. In this context, dovetail undercuts 31 may be provided so as to slide or clip etc. the sliding elements 24 therein. Likewise, the sliding base element 25 may be fixed on the bottom. There are in principle no limits on the fixing types and variants. Any modifications are possible in this context.

Otherwise, a complete sliding block 21 having associated sliding elements 24 inserted (preferably detachably inserted) into it can be inserted into the U-shaped recess to form the peg body, for example including by means of projections 33, which may be slid into corresponding recesses 35 in the peg body (FIG. 4).

Using the transverse stretching installation shown in a schematic plan view in FIG. 1 (which may also represent for example the first or second stage in the sequential transverse stretching installation), tests as regards an actual oil consumption can then be performed using different sliding elements.

In the tests performed, different sliding elements were used, starting with sliding elements as known in the prior art. In particular sliding elements were used which were attached to the individual pegs of the conveyor chain and interacted with the sliding face of the guide rails and/or carrier rails and which, in accordance with the prior art, consisted of fibre-reinforced PEEK material. Corresponding measurements were then taken for sliding elements according to the invention, which are abbreviated as B21 for short hereinafter. Thus, actual oil consumption values could be measured under actual production conditions of a stretching installation. In this context, as indirect variables, the torques of the drive motors at the entrance and exit of the stretching installation were the criteria. Using these variables, the coefficients of friction of the corresponding sliding pairs can be determined indirectly.

In accordance with FIG. 1, the following actual results thus occur, for example:
- the torques of the entry motors are for example 55% of the overall torque (here 4,400 [Nm]),
- on the drive side (DS), the exit torques are for example 31% of the overall torque (here 18,400 [Nm]), and
- the exit torques on the operator side (OS) are for example 28% of the overall torque (here, as stated, 18,400 [Nm]).

In FIG. 1, at the individual positions of the stretching zone and the heat treatment/cooling zone, the temperatures are specified at the top and bottom of the guide rails/carrier rails in each case.

In the described test setup according to FIG. 1, for example four lubricating assemblies are used, specifically at the inlet, in the region of the middle drive side, on the middle operator side and at the outlet.

In this connection, the following table specifies for these four lubricant supply units an example of the corresponding daily lubricant amounts, a particular speed factor (1.2) and a particular thickness factor (1.0) being applied. The penultimate column gives the theoretically determined value of 0.483 l per day.

The last column gives actually measured lubricant averages at the four lubricant unit supply points, in other words the actual oil consumption, the last row specifying the total daily lubricant amount.

| Lubrication site | Consumption [l/day] | Speed factor | Thickness factor | Consumption specification [l/day] | Actual consumption [l/day] |
|---|---|---|---|---|---|
| Inlet | 0.42 | 1.2 | 1.0 | 0.483 | 0.464 |
| Middle drive side | 0.42 | 1.2 | 1.0 | 0.483 | 0.435 |
| Middle operator side | 0.42 | 1.2 | 1.0 | 0.483 | 0.493 |
| Outlet | 0.42 | 1.2 | 1.0 | 0.483 | 0.341 |

Sliding Elements or Sliding Bodies According to the Invention

The prior art has already proposed sliding bodies or sliding elements which consist of graphite or comprise a significant proportion of graphite. As was described previously, it was proposed in the prior art to use graphite sliding elements which have been impregnated using polymers.

In the context of the invention, however, it has now been found that the use of polymers of this type merely means that if the graphite sliding bodies have pores these pores are filled in. This then has the result that no lubricant, such as oil, can penetrate into these pores, ultimately actually reducing the sliding capacity.

It has therefore been found in the context of the invention that sliding bodies made of graphite and in particular electrographite which have a minimum pore size should be used.

This minimum pore size should be approximately 8% or more than 8%. Good values can be achieved if the pore size is at least 9% or 10% and more. Values below 25% are entirely sufficient and satisfactory in this context.

As a result of this pore size, lubricant such as oil can then penetrate into these pores, causing the long-term sliding capacity of a graphite sliding element of this type to be greatly improved by comparison with conventional solutions. Ultimately, as a result of the capillary forces, the lubricant can penetrate into these pore openings and thus contributes to reducing the overall lubricant requirement. In the tests, it was found to be particularly advantageous if the pores of the sliding elements are soaked with oil as completely as possible, for example by storing them in an oil bath for several hours before they are installed in the bearing elements. This primary saturation greatly reduces wear.

The effects can be further improved by using a graphite sliding body which is impregnated with a minimum proportion of inorganic salts and in particular metal salts. Especially impregnation with metal salts in the form of phosphates (for example tertiary orthophosphates) leads to particularly good results. In particular, aluminium phosphate ($AlPO_4$) may also be mentioned here. A further improvement can be achieved by additionally subjecting the graphite powder used to isostatic pressing during the manufacturing process of the sliding elements. Finally, it should be noted that, during the impregnation with metal salts, metal salt compounds such as in particular metal phosphates should be used which have a particle size in the range of 3 μm and more and preferably less than 150 μm.

In conclusion, it can thus be established that the sliding bodies according to the invention are distinguished by one or other of the following features, especially in combination:
- The sliding elements are provided with an impregnation, preferably in the form of inorganic salts, in particular phosphates (salts and esters of orthophosphoric acid).
- The sliding elements are impregnated with metal salts, in particular in the form of aluminium phosphate ($AlPO_4$).
- The inorganic salts, in particular in the form of phosphates and particularly preferably in the form of aluminium phosphate, are embedded in the sliding element or sliding body in a proportion of 1% by weight to 20% by weight.
- The phosphates and in particular metal phosphates should preferably have particle sizes in the region of d50=30 μm, d90=100 μm and d50=5 μm, d90=15 μm and particularly preferably of d50=7 μm, d50=30 μm.
- The sliding elements are fully impregnated not only in a surface region or a surface layer up to 1 mm or 2 mm, but preferably completely.
- The starting materials required for manufacturing the sliding elements are "baked" together using a suitable method, for example by isostatic pressing, ultimately causing the sliding elements to be produced.
- The particle sizes and the particle distribution of the graphite powder used as a starting material for manufacturing the sliding elements should also be in particular ranges. The maximum particle size distribution (average particle size, expected value) of the graphite powder used as a starting material, but also of the sliding element manufactured by pressing, is between 3 and 15 μm, depending on the desired mechanical values, for example the bending strength. Preferably, average particle sizes between 7 and 10 μm have been found to be suitable. Sizes between 14 and 18 μm as a median d(50), between 2 and 4 μm as a d(10) and between 42 and 50 μm as a d(90) have been measured. (The values $d_{10}$, $d_{50}$ and $d_{90}$ are used to characterise a particle size distribution. The $d_{50}$ value is defined as the average particle size distribution [DIN 13320]. The values $d_{10}$ and $d_{90}$ are used to describe the width of a particle size distribution $d_{width}=d_{90}-d_{10}$).
- The open pore sizes and/or pore distribution of the sliding elements is at least ≥8 by volume or preferably ≥9% by volume, 10% by volume, 11% by volume, 12% by volume, 13% by volume, 14% by volume or ≥15% by volume. In this context, the corresponding values for the open pore size of the sliding element should further be ≤20% by volume, in particular ≤18% by volume, 16% by volume, 15% by volume, 14% by volume, 13% by volume, 12% by volume or in particular ≤11% by volume.

The sliding elements have for example oil-saturated pores or in general fluid-filled pores, specifically under conventional operating conditions, for example at an air humidity of ≥5 (preferably 8-20) [g/m$^3$].

In this context, it is further noted that as a fundamental principle the particle measurement has a distribution curve, for example ideally a normal distribution.

Tests

A series of tests were performed on stretching installations, specifically both using fibre-reinforced sliding elements such as are known in the prior art and using graphite sliding elements which already have one or more of the preferred features according to the invention.

For this purpose, reference is made to the table of properties appended to the end of the description, from which various values relating to conventional fibre-reinforced graphite sliding elements and to a graphite sliding element according to the invention can be derived.

In the aforementioned table of properties appended to the end of the description, values for graphite sliding bodies can be derived from columns a, b, c, d, e, f, P, SFU and SR, these being graphite sliding bodies which are known from the prior art.

The final column reproduces the data relating to a graphite body according to the invention, under the designation B21.

Using fibre-reinforced sliding elements and graphite sliding bodies of this type, test series were performed, the table reproduced below establishing what lubricant amounts are required when a conventional fibre-reinforced PEEK sliding body is used in a stretching installation and by contrast when a graphite body is used which already has one, two or three preferred features. In this context, a chain system C was used in which it was possible to move a plastics material film web to be stretched through the stretching installation at a maximum advance speed (limit speed) of 525 m/min. The sliding bodies used were distinguished by:

C1: The sliding body C1 consists of a conventional fibre-reinforced sliding body (PEEK) which has been impregnated as described in the prior art with a polymer mass.

C2: A corresponding test series was performed using a graphite sliding body C2 modified from the prior art, which by way of example had an open pore size of 10%.

C3: In this test, by comparison with the test setup using the sliding body C2, the sliding body C3 had further additionally been fully impregnated with aluminium phosphate.

C4: This sliding body C4 is a graphite sliding body which has a pore size of 10%, has additionally been impregnated with aluminium phosphate, and has further been subjected to isostatic pressing.

Test series were performed in which corresponding conveyor chains comprising the sliding bodies were used for up to 1000 operating hours and well over 1000 operating hours.

In this context, the individual rows of the table below specify a base factor Bf for the sliding bodies C1, C2, C3 and C4, which represents the amount of lubricant [in litres] per minute and per day when the advance speed of the plastics material film is less than 525 m/min and the film thickness is ≤20 μm, for the sliding bodies C1, C2, C3 and C4.

| Chain system | Operating hours | C1 [10$^{-3}$] | C2 [10$^{-3}$] | C3 [10$^{-3}$] | C4 [10$^{-3}$] |
|---|---|---|---|---|---|
| Basic factor of the sliding face [l/m/24 h] (v ≤ 300 m/min, film thickness ≤ 20 μm) | ≤1000 h | 28 | 14 | 7 | 5.04 |
| | >1000 h | 12 | 6 | 4 | 2.52 |
| Limit speed [m/min] | | 525 | | | |

The following table summarises the oil consumptions, which are dependent on the speed and the film load:

| Chain system C of length 350 [m], end speed 525 [m/min] and 30 [μm] film thickness | Prior art sliding system C1 | B21 sliding system test rig tests C2 | B21 sliding system test rig C3 | B21 sliding system test rig C4 |
|---|---|---|---|---|
| Chain length 350 [m] Bf = 0.014 ≤ 100% for >1000 h | 4.90 | 2.45 | 1.67 | 0.88 |
| Factor of increase due to speed | | 1.441 | | |
| | 7.06 | 3.53 | 2.40 | 1.27 |
| Factor of increase due to film thickness | | 1.15 | | |
| | 5.64 | 2.82 | 1.92 | 1.01 |
| Overall, only dependent on speed | 11.96 | 5.98 | 4.07 | 2.15 |
| Overall, with film load | 17.60 | 8.80 | 5.98 | 3.17 |

In this context, at a limit speed of 525 m/min and a chain length of 350 [m], the consumption values reproduced in the final row occurred.

For a better understanding, in this connection an example calculation for the chain system C1 comprising a standard PEEK sliding system having a chain length of KL=350 m will be given. Use for more than 1000 operating hours results in a base consumption of $$\text{Consumption} = KL * Bf = 14 * 350 \text{ m} * 10^{-3} = 4.9$$

For a chain sliding system which is preferred according to the invention, in accordance with example C4, this results in a greatly reduced oil amount of only 0.9 [l/24 h].

Preferred Values for a Graphite Sliding Body According to the Invention

The invention table appended at the end of the description specifies preferred values for the graphite body according to the invention.

In this context, for achieving the benefit according to the invention, it is of decisive importance that the graphite body according to the invention has the at least preferably specified pore size.

The lubricant reduction can be further improved if the graphite body according to the invention is further impregnated with an inorganic salt, in particular a metal salt, preferably with a metal phosphate, in particular using aluminium phosphate. A further improvement occurs, as an alternative to the aforementioned point and preferably in addition, if the graphite body has preferably additionally been subjected to isostatic pressing.

In principle, it is sufficient if the impregnation with the inorganic salt is carried out or provided in a sufficient surface layer having a sufficient layer on the sliding body or sliding element. Preferably, however, a sliding element is used which is fully impregnated with the inorganic salt.

Preferred Sliding Pairs

Aside from the sliding elements explained above which have the advantages according to the invention, favourable reduced coefficients of friction and thus a reduced lubricant requirement occur, in particular in conveyor chains such as are also used in stretching installations, if the corresponding carrier elements cooperating with the sliding elements also have specific properties.

In particular in the case of a stretching installation, the carrier elements which cooperate with the conveyor chain and/or the pegs are guide rails, carrier rails and/or if applicable control rails. In this context, the sliding elements according to the invention are preferably provided on the conveyor chain or the pegs, specifically at the points which cooperate with the corresponding sliding faces on the guide rail and/or the conveyor rail (or if applicable the control rail). Good physical compatibility occurs as a result of a pairing of materials having identical or similar thermal expansion coefficients. Through targeted selection of the formulation constituents, the expansion coefficient both of the sliding elements and of the rails which interact therewith can be adjusted.

The sliding elements according to the invention thus have advantages especially when they are used in stretching installations. This has never been subject to separate examination in the prior art thus far.

Good physical compatibility then occurs as a result of pairing materials having identical or similar thermal expansion coefficients. Good counter partners for the conveyor chains/conveyor pegs provided with the sliding elements according to the invention are, for example, rails formed from hard materials, such as grey iron, hard metal, aluminium oxide, silicon carbide, glass, materials coated with DLC, and in particular hard-alloy steels. These are thus materials such as are used in any case in particular for rails, in other words guide rails and carrier rails, in stretching systems.

Purely by way of example, the properties of a counter partner of this type, in the form of a guide rail as used in the performed tests, will be reproduced:
Material 1.7225=42CrMo4V (quenched and tempered steel)
Surface roughness: Rz5 (polished)
Hardness: Surface >600-650 HV 0.5
 at depth 0.2>400 HV 0.5
 core hardness 0.3>300+50 HV 0.5
Thermal expansion coefficient
at 20° C.-200° C.: $12.1 \times 10{-6}$ K−1
Change in the Required Lubricant Amount as a Function of Further Factors In principle, further factors may be noted which lead to a change in the lubricant amount.

Although the changes discussed hereinafter in the lubricant amount also occur in conventional graphite bodies, the corresponding effects are sometimes particularly surprising when a graphite body according to the invention is used. In this context, if the graphite body according to the invention or the preferably appropriately developed graphite body according to the invention is used, it is ensured in all cases that the necessary lubricant amount is much lower than in comparable prior art solutions, in particular if PEEK sliding bodies are used.

In this context, it is assumed that these sliding bodies, as in the prior art, are also preferably used in contact with guide rails/carrier rails (and/or control rails), in particular in stretching installations of which the rails consist of or comprise steel as the basic substance.

Speed-Dependent Factor

Above a limit speed, there is a linearly increasing speed-dependent additional oil consumption in addition to the base value reproduced in the table above.

In tests, the following relationship was demonstrated:

$$F_v = (_v E - _v G)[m/min] * 0.3[\% \ min/m] + 1$$

Here, $F_v$ is the factor for the additional oil consumption at an end speed $_vE$ on the basis of a film thickness of 20 μm. In this context, the limit speed $_vG$ is dependent on the chain system in question. For the chain system C presently under consideration, $_vG$ is 300 [m/min]. Up to $_vG$, a constant oil consumption value is set.

Load-Dependent Factor

For film thicknesses greater than 20 μm the oil consumption increases as a result of the additional forces due to the greater film thickness, in accordance with the relationship:

$$F_D = (th - 20)[\mu m] * 1.5[\%/\mu m] + 1$$

Here, $F_D$ is the factor for the film thickness th.

The corresponding relationships can be seen from FIG. 6 (graph) graph is missing or incorrectly characterised, which illustrates the lubricant amounts used when a graphite sliding body (C1, C2, C3 or C4) corresponding to the above definition is used.

Figure 7:
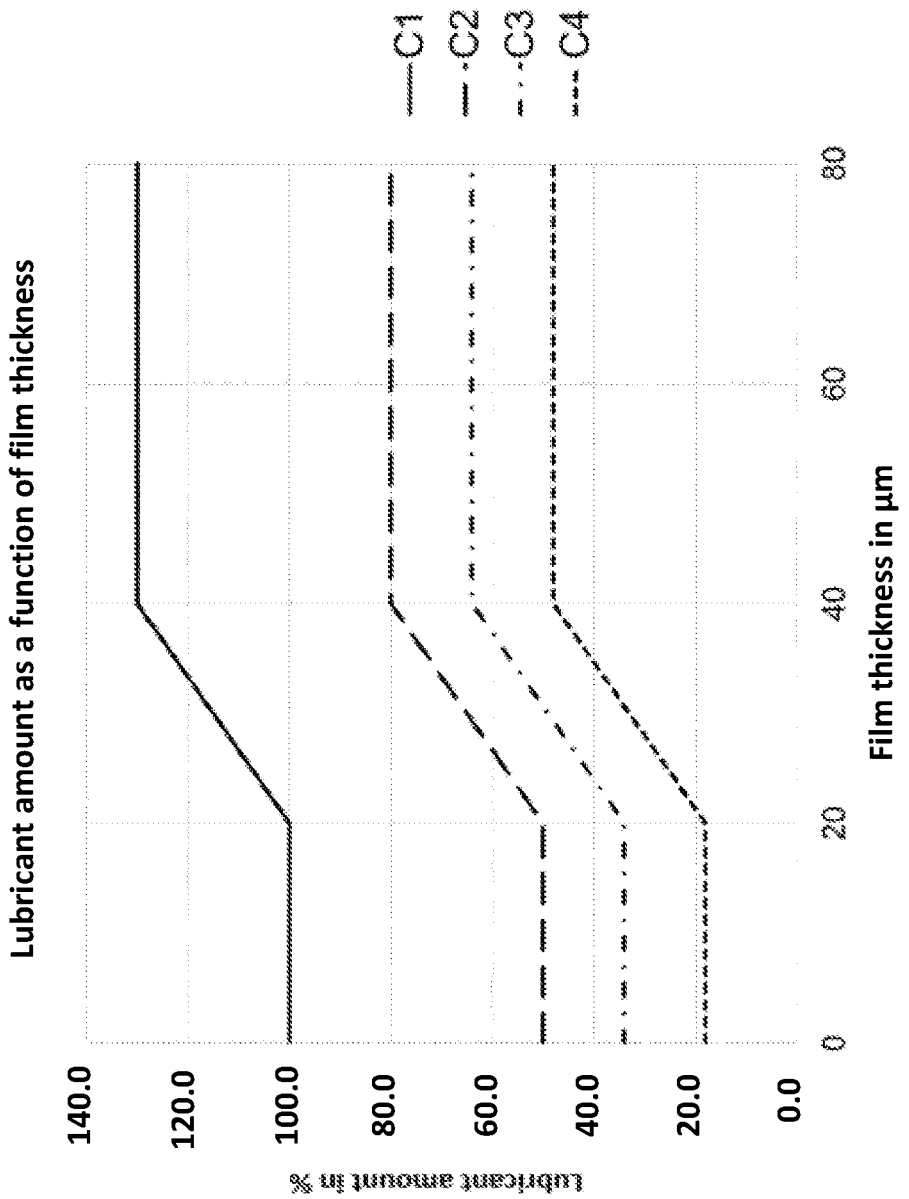
FIG. 7 is a graph of oil consumption as a function of the film thickness and thus of a changing load.
Figure 8:
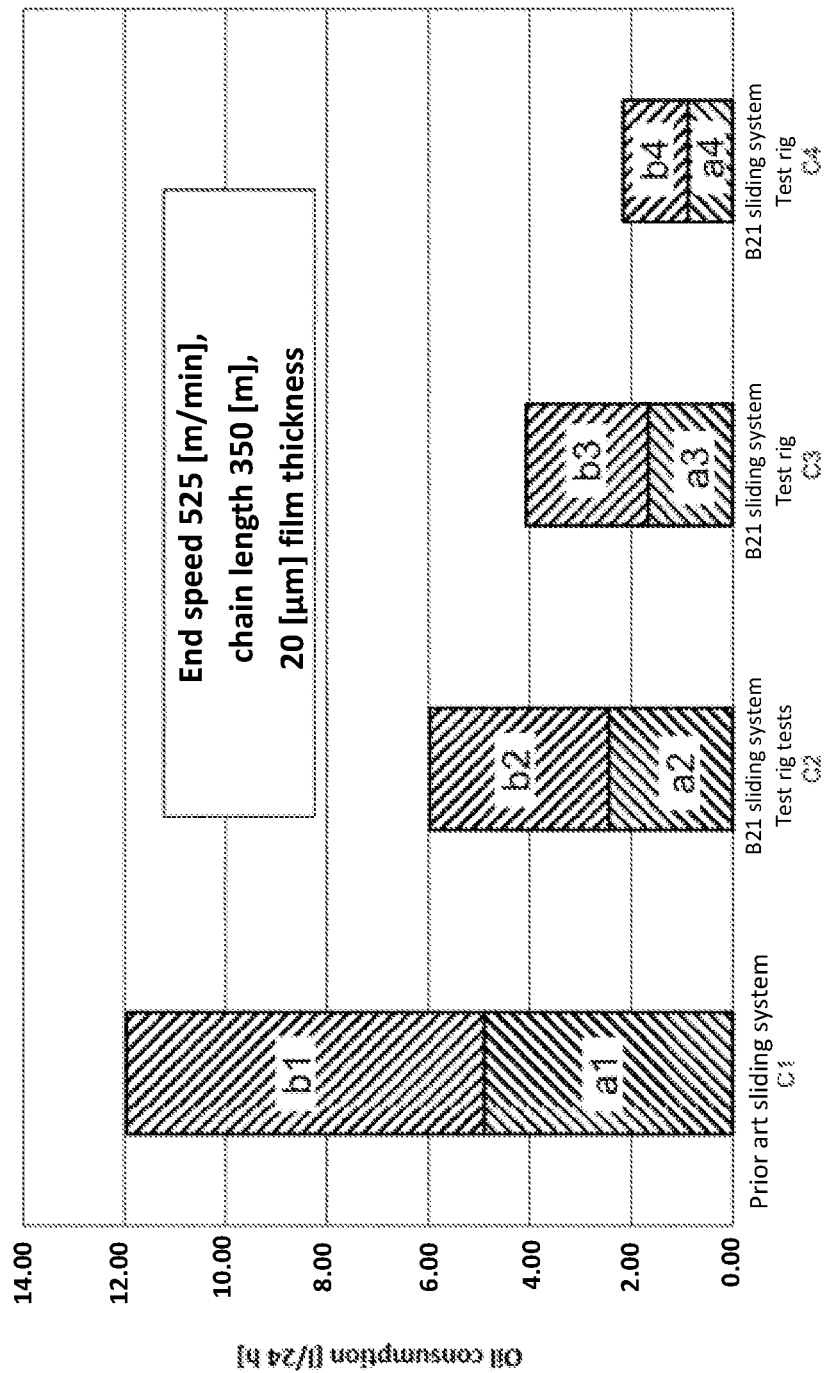
FIG. 8 is a graph of a different oil consumption for four different chain systems, some from the prior art and some with a configuration according to the invention of the sliding elements.

Using these above-mentioned supplementary values thus gives the daily oil or lubricant consumption in a corresponding stretching installation using a conveyor chain which moves along together with the described sliding bodies on a guide rail, as can be seen in FIG. 7.

In this context, FIG. 7 shows the oil consumption along with its speed-dependent factor $F_v$ and the load-dependent factor $F_D$, depending on whether a sliding stone C1, C2, C3, C4 is used. In this context, as a function of the sliding stones C1-C4 used, FIG. 7 shows the speed-dependent factor $F_v$ abbreviated as a1, a2, a3 or a4 and the load-dependent factor $F_D$ abbreviated as b1, b2, b3 or b4.

It can also be seen from this that the sliding bodies according to the invention lead to a drastic reduction in the lubricant requirement, specifically in the cases
   where only the pore size has the desired minimum dimension (of more than 8% and preferably less than 20%),
   where additionally, in the case of a sliding stone C3, the graphite body has additionally further been impregnated with a metal salt, preferably in the form of a metal phosphate, in other words using aluminium phosphate in the embodiment shown, and
   where a sliding body accordingly prepared in this manner has additionally further been subjected to isostatic pressing.

FIG. 7 shows, on the left, the oil medium consumption for a stretching installation using prior art stretching bodies C1 (PEEK sliding system) and, on the right, the variant preferred according to the invention comprising a sliding body C4.

Decreasing Lubricant Consumption with Higher Temperature of the Sliding Pair (Guide Rail/Sliding Element)

Finally, it should further be noted that, both when prior art graphite sliding bodies are used and when graphite sliding bodies according to the invention are used, the coefficient of friction decreases with an increasingly high temperature of the sliding pair (guide rail/sliding element).

Figure 9:
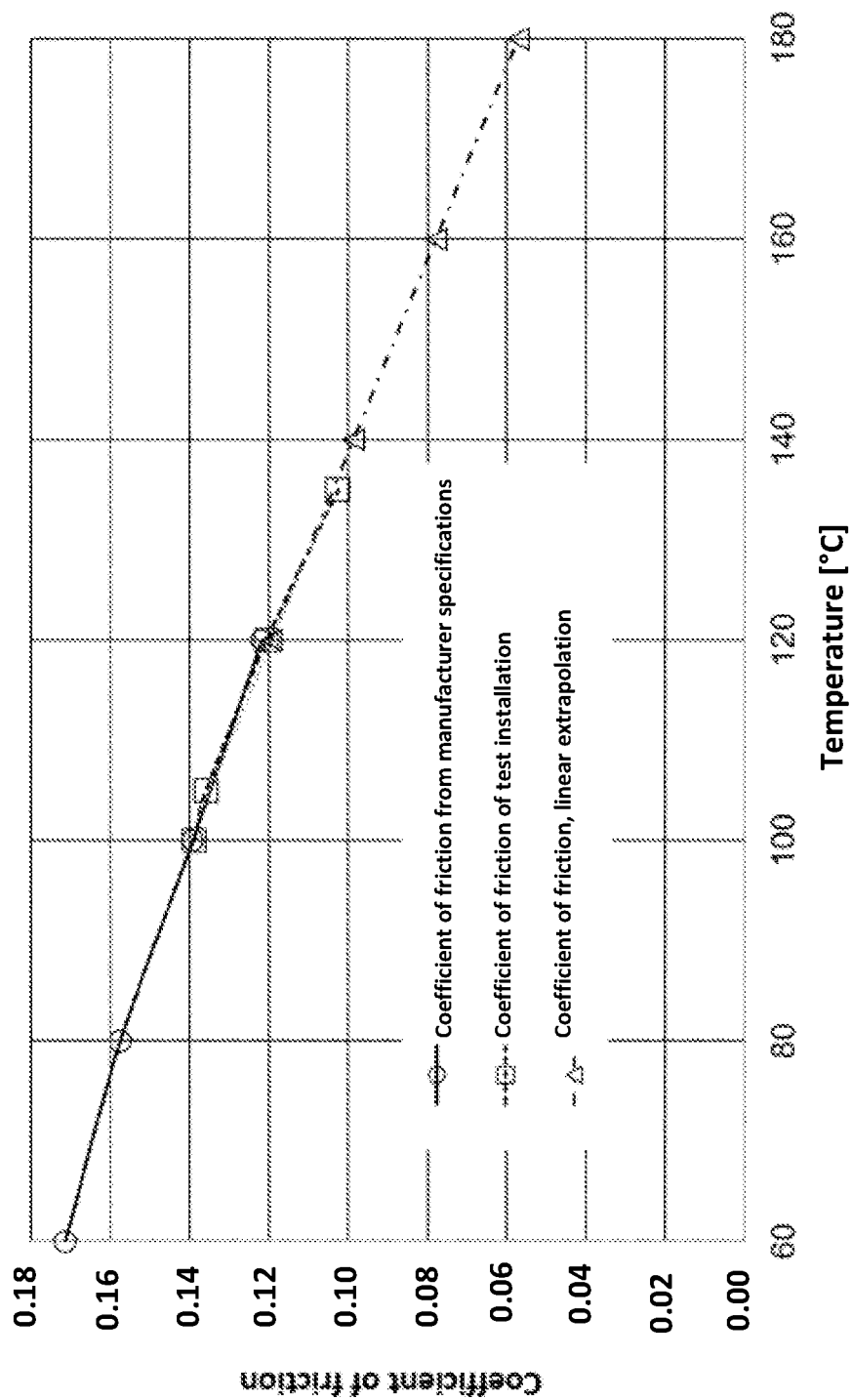
FIG. 9 is a graph of coefficients of friction of a sliding element according to the invention.

This is shown in FIG. 9.

Therefore, the lubricant requirement can also be reduced further if the sliding pair F has been brought to an appropriate higher temperature level.

The coefficients of friction in FIG. 9 are divided into three sections, the first section R1 relating to the coefficient of friction according to manufacturer specifications, the section R2 relating to the coefficient of friction as determined from the test installation, and section R3 reflecting the coefficient of friction as derivable from linear extrapolation on the basis of the first two coefficient of friction progressions according to R1 and R2.

Decreasing Friction and Resulting Reduction in the Lubricant Requirement as a Result of Appropriately Broken-in Graphite Elements with a Polished Graphite Sliding Body Surface A comparison of used and already inserted graphite sliding elements shows significant differences in topography. New graphite sliding elements generally have height profile differences of up to approximately 5 μm per face element, while in used graphite sliding elements these height profile differences often only remain as a height difference of approximately 1 μm.

The height structure is thus homogenised in broken-in sliding elements, peaks on the graphite body sliding face having been polished away. This homogenisation of the topography also contributes to broken-in sliding elements having a lower oil consumption and explains why this is the case.

Sliding Elements According to the Invention

The table of properties reproduced on the page below has already been mentioned.

It establishes values for sliding elements having corresponding different test setups.

The sliding elements a, b, c, d, e, f, P, SFU, SR and B21 along with the respectively stated properties were determined in identical tests and test setups. The sliding elements a-f, P, SFU and SR are known from the prior art. The sliding element given in the penultimate column and labelled with the name B21 relates to an optimised sliding element according to the invention.

The corresponding values for the density, hardness, bending strength, compressive strength, modulus of elasticity, the relevant values for the thermal expansion, for the thermal conductivity etc. can be seen from this table of properties for the prior art sliding elements as well as for the sliding element B21 according to the invention.

The final column E specifies that preferred values for the sliding element according to the invention may be for example up to 75% less than the value specified in the penultimate column for the sliding element B21 up to 25% above these values.

Thus, the final column E states the preferred range specifications which represent the preferred properties for the sliding element according to the invention.

This is intended to express that for example the porosity, which for the sliding element B21 according to the invention is specified as 10% by volume, can fluctuate from 7.5% by volume to 12.5% by volume.

In this context, the deviations may be between any sub-ranges of this range specification.

In other words, for example, for the specification $-\leq 25\%$, each value may deviate from the optimum value by preferably less than $-25\%$, $-24\%$, $-23\%$, $-22\%$, ..., $-5\%$, $-4\%$, $-3\%$, $-2\%$ or by less than $-1\%$.

Likewise, for example, for the specification $+25\%$, the values should preferably not be greater than $+25\%$, in particular not greater than $+24\%$, $+23\%$, $+22\%$, ..., $+5\%$, $+4\%$, $+3\%$, $+2\%$ or not greater than $+1\%$ with respect to the value specified in the penultimate column in each case.

In this context, the aforementioned deviations are of significance especially as regards the porosity. The other values could also potentially be over the below or above the specified range limits.

Property table (comparistion of properties of some graphites which were tested as sliding elements)

| Property | Units | Standard | a | b | c | d | e | f | P | SFU | SR | B21 | E |
|---|---|---|---|---|---|---|---|---|---|---|---|---|---|
| Density | g/cm$^3$ | DIN IEC 60413/203 | 1.70 | 1.75 | 1.70 | 1.68 | 1.73 | 2.55 | 1.78 | 2.02 | 1.88 | 1.85 | ±≤25% |
| Hardness HR$_{5/100}$ | Rockwell B | DIN IEC 60413/303 | 105 | 105 | 105 | 95 | 105 | 115 | 86 | 115 | 110 | 90 | ±≤25% |
| Bending strength | MPa | DIN IEC 60413/501 | 55.2 | 40 | 60 | 35 | 75.8 | 79.3 | 112 | 105 | 85 | 58.6 | ±≤25% |
| Compression strength | MPa | DIN 51910 | 155 | 100 | 180 | 10 | 120 | 290 | 175 | 215 | 170 | 148 | ±≤25% |
| Modulus of elasticity | GPa | DIN 51915 | 22 | 16 | 18 | 8.96 | 22 | 20.7 | 14.5 | 12 | 13.5 | 13.8 | ±≤25% |
| Thermal expansion (20-200° C.) [μm/m ° C.] | $10^{-4}K^{-1}$ | DIN 51909 | 3.06 | 6.5 | 4.14 | 3.78 | 11.0$^1$) | 5.94 | 8.1 | 7.8 | 4.7 | 3.96 | ±≤25% |
| Thermal conductivity | $Wm^{-3}K^{-1}$ | DIN 51908 | 12 | 11 | 14 | 25 | 6 | 32.9 | 70 | 82 | 100 | 79.5 | ±≤25% |
| Thermal resistance in oxidising atmosphere | ° C. | | 350 | 350 | 350 | 500 | 180 | | | | | 600 | ±≤25% |
| Porosity (open) | Vol. % | | 11 | | 8 | 14 | 0 | <2.5 | 20 | 8 | 10 | 10 | ±≤25% |
| Elec. resistivity | μΩm | | | | | | | | | 19.5 | 10 | 13 | ±≤25% |
| Average particle size | μm | | | | | | | | | 1 | <5 | 3 | ±≤25% ±≤100% |

$^1$)from 20-150° C.

The invention claimed is:

1. A sliding element, for a stretching installation and/or conveyor chain, comprising graphite or electrographite, wherein the sliding element has pores, the open pore size being ≥7.5% by volume, and the particle size of the graphite particles used as a starting material for the sliding elements is between 3 μm and 15 μm, wherein the sliding element is impregnated with inorganic salts and/or inorganic salts are embedded in the sliding element.

2. A sliding element according to claim 1, wherein the open pore size is at least ≥8% by volume.

3. A sliding element according to claim 1, wherein the open pore size of the sliding element is ≤20% by volume.

4. A sliding element according to claim 1, wherein the particle size of the graphite particles used as a starting material for the sliding elements is greater than or equal to 4 μm.

5. A sliding element according to claim 1, wherein the graphite particles used as a starting material for manufacturing the sliding elements are in a particle size distribution in which the median value d(50) for the particle size is between 14 μm and 18 μm, and the value for d(10) is between 2 μm and 4 μm and for d(90) is between 42 μm and 50 μm.

6. A sliding element according to claim 1, wherein at least 60% of the pores provided in the sliding element are soaked with oil.

7. A sliding element according to claim 1, wherein the inorganic salts are embedded at least in a surface layer of the sliding element and/or the sliding element is impregnated with inorganic salts in this region.

8. A sliding element according to claim 1, wherein the sliding element is impregnated with inorganic salts or comprises embedded inorganic salts, which consist of or comprise phosphates or tertiary orthophosphates.

9. A sliding element according to claim 4, wherein the inorganic salts make up 1% by weight to 10% by weight.

10. A sliding element according to claim 1, wherein the sliding element is formed as an isostatically pressed sliding element.

11. A sliding element according to claim 1, wherein the sliding surface of the sliding element has a maximum roughness at which height deviations are below 5 μm.

12. A sliding element according to claim 11, wherein the sliding surface of the sliding element is polished.

13. A stretching installation or conveyor chain for a stretching installation, comprising sliding elements, wherein
the sliding elements comprising graphite or electrographite, and
the sliding elements have pores, the open pore size being ≥7.5% by volume,
the particle size of the graphite particles used as a starting material for the sliding elements is between 3 μm and 15 μm, and
wherein the sliding elements are impregnated with inorganic salts and/or inorganic salts are embedded in the sliding elements.

14. A stretching installation or conveyor chain for a stretching installation according to claim 13, wherein, as a counter partner for the conveyor chain, a carrier construction in the form of a guide rail and/or carrier rail and/or control rail is provided, the thermal expansion coefficient of which corresponds to the thermal expansion coefficient of the sliding elements or deviates therefrom by less than 25%.

15. A stretching installation or conveyor chain for a stretching installation according to claim 14, wherein the guide rail and/or carrier rail and/or control rail consists of a material having a degree of hardness which corresponds to the degree of hardness of the sliding elements or deviates therefrom by less than 25%.

16. A stretching installation or conveyor chain for a stretching installation according to claim 14, wherein the guide and/or carrier and/or control rail is heated above a temperature limit value to reduce the coefficient of friction.

17. A sliding element according to claim 1, wherein the open pore size is at least ≥15% by volume.

18. A sliding element according to claim 1, wherein the open pore size of the sliding element is ≤11% by volume.

19. A sliding element according to claim 1, wherein the particle size of the graphite particles used as a starting material for the sliding elements is greater than or equal to 10 μm.

20. A sliding element according to claim 1, wherein the particle size of the graphite particles used as a starting material for the sliding elements is less than 14 μm.

21. A sliding element according to claim 1, wherein the particle size of the graphite particles used as a starting material for the sliding elements is less than 5 μm.

22. A sliding element according to claim 1, wherein over 95% of the pores provided in the sliding element are soaked with oil.

23. A sliding element according to claim 1, wherein at least 99% of the pores provided in the sliding element are soaked with oil.

24. A sliding element according to claim 1, wherein the sliding element is impregnated with aluminium phosphate.

25. A sliding element according to claim 4, wherein the inorganic salts make up 4% by weight to 6% by weight.

26. A sliding element according to claim 1, wherein the sliding surface of the sliding element has a maximum roughness at which height deviations are below 1 μm.

27. A stretching installation or conveyor chain for a stretching installation according to claim 13, wherein, as a counter partner for the conveyor chain, a carrier construction in the form of a guide rail and/or carrier rail and/or control rail is provided, the thermal expansion coefficient of which corresponds to the thermal expansion coefficient of the sliding elements or deviates therefrom by less than 5%.

28. A stretching installation or conveyor chain for a stretching installation according to claim 14, wherein the guide rail and/or carrier rail and/or control rail consists of a material having a degree of hardness which corresponds to the degree of hardness of the sliding elements or deviates therefrom by less than 5%.

* * * * *